(12) United States Patent
Hager et al.

(10) Patent No.: US 12,044,273 B2
(45) Date of Patent: Jul. 23, 2024

(54) BEARING ASSEMBLY

(71) Applicant: Miba Gleitlager Austria GmbH, Laakirchen (AT)

(72) Inventors: Gunther Hager, Micheldorf (AT); Stefan Schallmeiner, Steyrermuehl (AT); Philipp Bergmann, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 218 days.

(21) Appl. No.: 17/779,677

(22) PCT Filed: Nov. 25, 2020

(86) PCT No.: PCT/AT2020/060419
§ 371 (c)(1),
(2) Date: May 25, 2022

(87) PCT Pub. No.: WO2021/102496
PCT Pub. Date: Jun. 3, 2021

(65) Prior Publication Data
US 2022/0403889 A1  Dec. 22, 2022

(30) Foreign Application Priority Data
Nov. 26, 2019 (AT) .............................. A 51026/2019

(51) Int. Cl.
*F16C 41/00* (2006.01)
*G01M 13/04* (2019.01)

(52) U.S. Cl.
CPC ........... *F16C 41/004* (2013.01); *G01M 13/04* (2013.01); *F16C 2233/00* (2013.01); *F16C 2360/22* (2013.01)

(58) Field of Classification Search
CPC ............... F16C 41/004; F16C 2233/00; F16C 2360/22; F16C 9/02; F16C 9/04;
(Continued)

(56) References Cited

U.S. PATENT DOCUMENTS 4,688,951 A * 8/1987 Guers ................... F16C 41/007
384/446
8,878,408 B2  11/2014 Rink et al.
(Continued)

FOREIGN PATENT DOCUMENTS

AT  408 900 B  8/2001
CA  2 884 602 A1  9/2015
(Continued)

OTHER PUBLICATIONS

International Search Report in PCT/AT2020/060419, mailed Mar. 23, 2021.

*Primary Examiner* — Alan B Waits
(74) *Attorney, Agent, or Firm* — Collard & Roe, P.C.

(57) ABSTRACT

A bearing assembly with a consumer of electrical energy and at least one energy generating device, has a first component and a second component, which are arranged so as to be movable repetitively relative to one another. The energy generating device has at least one electrical conductor arranged in a loop shape and at least one permanent magnet,
(Continued)

Figure 3:
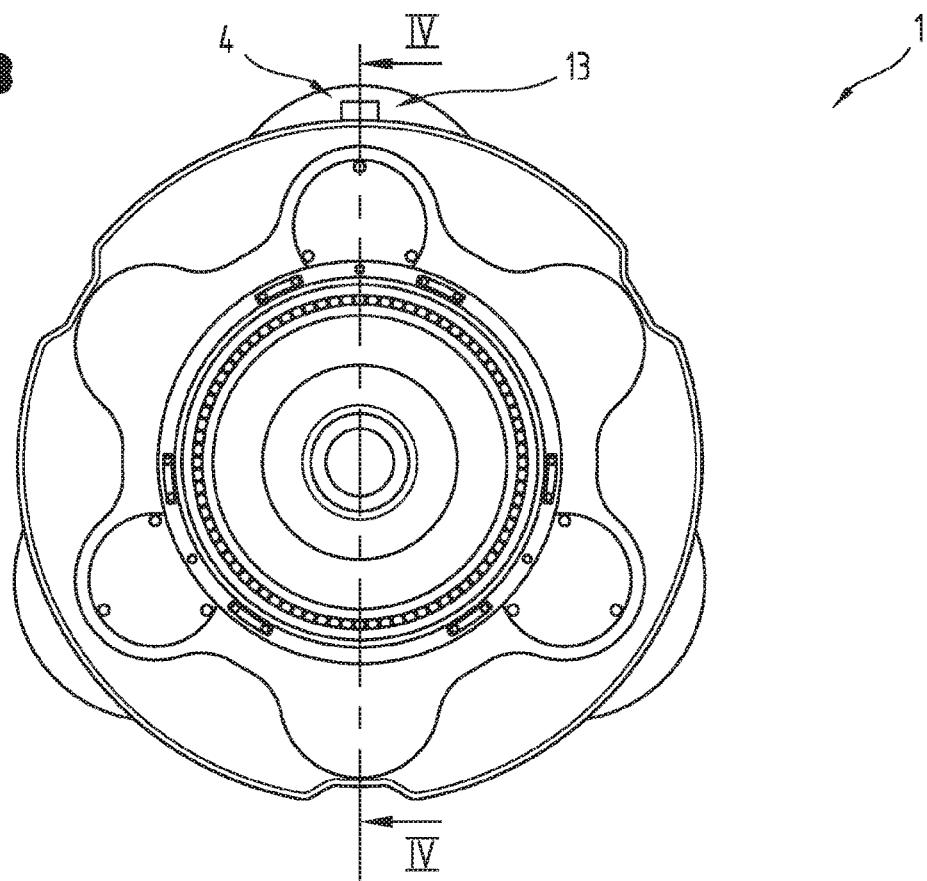

wherein the electrical conductor is arranged on the first component, and the permanent magnet is arranged on the second component.

10 Claims, 3 Drawing Sheets

(58) Field of Classification Search
CPC ........ F16C 17/02; F16C 17/022; F16C 17/10; F16C 17/12; G01M 13/04; F02B 63/042
See application file for complete search history.

(56) References Cited

U.S. PATENT DOCUMENTS

| | | | |
|---|---|---|---|
| 8,890,383 B2 | 11/2014 | Rink | |
| 11,129,289 B2 | 9/2021 | Weeth et al. | |
| 2003/0173844 A1* | 9/2003 | Iwamoto | F16C 9/02 |
| | | | 310/90 |
| 2008/0159674 A1* | 7/2008 | Varonis | F16C 33/58 |
| | | | 374/E13.01 |
| 2012/0156034 A1 | 6/2012 | Sabannavar et al. | |
| 2014/0055010 A1 | 2/2014 | Sigal et al. | |
| 2016/0208849 A1* | 7/2016 | Gorges | F16C 33/208 |
| 2016/0311303 A1 | 10/2016 | Schuttenbach Von et al. | |
| 2017/0241362 A1 | 8/2017 | Beerens | |
| 2019/0063502 A1* | 2/2019 | Lueck | F16C 17/12 |
| 2021/0277954 A1* | 9/2021 | Elfert | F16C 33/34 |

FOREIGN PATENT DOCUMENTS

| | | |
|---|---|---|
| CN | 102741574 A | 10/2012 |
| CN | 102741575 A | 10/2012 |
| CN | 106151295 A | 11/2016 |
| CN | 108139240 A | 6/2018 |
| DE | 43 15 463 C1 | 5/1994 |
| DE | 10 2007 052 426 A1 | 5/2009 |
| DE | 10 2012 202 029 A1 | 8/2013 |
| DE | 10 2012 202 030 A1 | 8/2013 |
| DE | 10 2018 102 203 A1 | 8/2019 |
| EP | 1 022 702 A2 | 7/2000 |
| EP | 2 610 513 A1 | 7/2013 |
| EP | 2 963 409 A1 | 1/2016 |
| EP | 3 045 749 A1 | 7/2016 |
| EP | 3 211 202 A1 | 8/2017 |
| EP | 3 343 030 A1 | 7/2018 |
| GB | 2 538 624 A | 11/2016 |
| JP | 2004-357479 A | 12/2004 |
| JP | 2009-254163 A | 10/2009 |
| WO | 2013/117644 A1 | 8/2013 |
| WO | 2013/160053 A1 | 10/2013 |
| WO | 2017/025580 A1 | 2/2017 |
| WO | 2017/102815 A1 | 6/2017 |
| WO | 2019/120870 A1 | 6/2019 |
| WO | 2019/149299 A1 | 8/2019 |

* cited by examiner

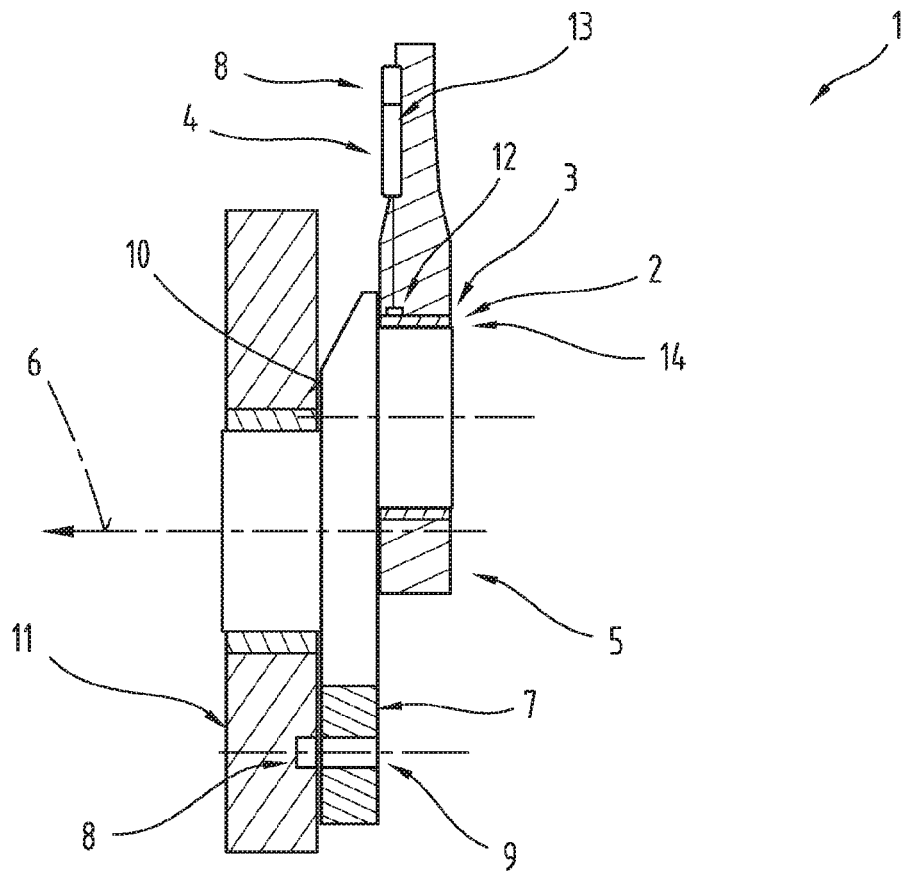
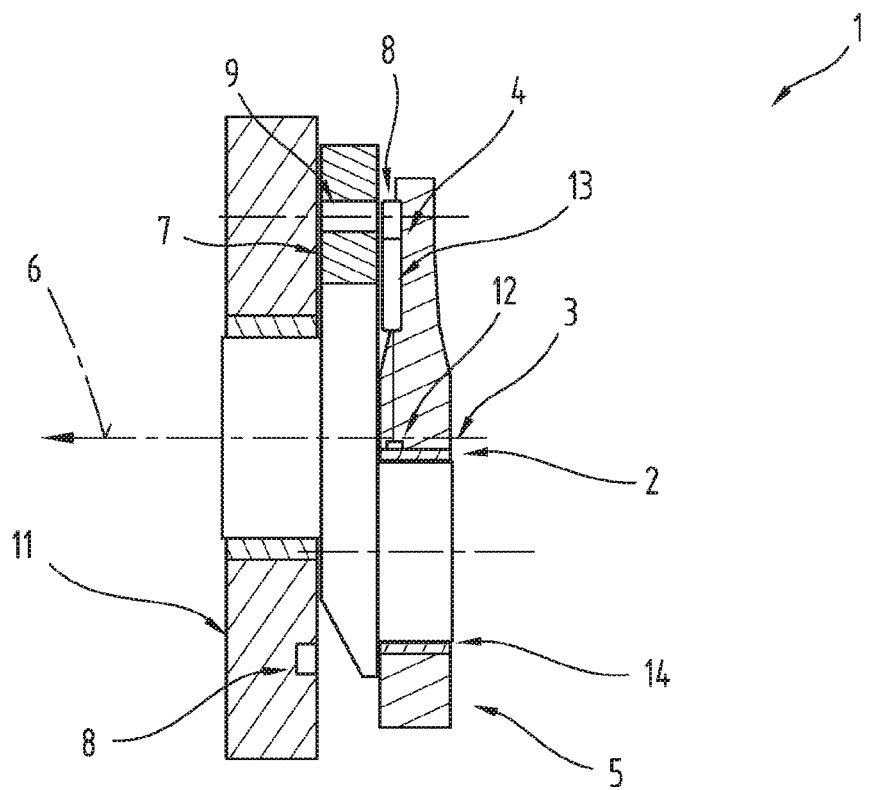

BEARING ASSEMBLY

CROSS REFERENCE TO RELATED APPLICATIONS

This application is the National Stage of PCT/AT2020/060419 filed on Nov. 25, 2020, which claims priority under 35 U.S.C. § 119 of Austrian Application No. A51026/2019 filed on Nov. 26, 2019, the disclosure of which is incorporated by reference. The international application under PCT article 21(2) was not published in English.

The invention relates to a bearing assembly comprising at least one sliding bearing element, at least one consumer of electrical energy and at least one energy generating device for the self-sufficient provision of the electrical energy, wherein the bearing assembly further comprises a first component and a second component arranged next to the first one in the axial direction of the bearing assembly, said components being arranged so as to be movable repetitively relative to one another.

The invention further relates to a method for supplying a consumer of electrical energy, which is arranged in a bearing assembly comprising at least one sliding bearing element, with electrical energy, which is generated in at least one energy generating device of the bearing assembly for self-sufficient provision of the electrical energy, wherein the bearing assembly further comprises a first component and a second component arranged next to the first component in the axial direction of the bearing assembly, said components being movable repetitively relative to one another.

During the past years, the sensory observation of sliding bearings gained increasing significance. Besides indirect measurement of sliding bearing parameters, for example due to the temperature increase of the bearing receptacle, the arrangement of sensors inside or in the immediate vicinity of the lubrication gap is increasingly at the forefront of development. Not only the environmental conditions for the sensor technology are problematic, but also the mechanical characteristics of plain bearings, such as the presence of rotating components. AT 408 900 B is mentioned by way of example, from which a device for monitoring a sliding bearing is known, which comprises a bearing shell clamped in a support body, with at least one measuring sensor arranged in the bearing shell region for temperature-dependent measuring signals and with an evaluation circuit for the measuring signals. The measuring sensor is formed as a pressure sensor for pressure forces acting in the circumferential direction of the bearing shell or for radial pressure forces between the bearing shell and the support body.

In this context, the question of the energy supply for the sensors arises. It is already known from the prior art that the generation of energy is to take place directly in the sliding bearing. Accordingly, US 2016/0208849 A1, for example, describes a sliding bearing and a method for producing the same. The sliding bearing may comprise a metallic substrate, an electrically insulating layer on the metallic substrate, and an electrical component on the electrically insulating layer. The sliding bearing may be operatively connected to a monitoring module, which is configured to monitor the electrical component. The bearing shell may have micro-generators for locally generating power from mechanical energy, e.g. from mechanical vibrations in the bearing shell.

From EP 2 963 409 A1, as well, a system comprising a plurality of essentially identical components in the form of self-lubricating rotor pitch control bearings of a helicopter is known, which bearings work under essentially identical conditions, wherein, however, each of the components is equipped with at least one sensor for measuring the same operating parameter of the components at a given time. Moreover, the system comprises a monitoring unit configured to receive and process the signals of the sensors and to generate maintenance data based on the sensor signals. The components may be provided with energy harvesting means for generating energy from the movement of one component relative to other components. This enables a continuous and autonomous operation of the sensors.

WO 2013/160053 A1 describes a method for monitoring a rolling bearing, comprising the step of obtaining data concerning one or more of the factors that influence the residual life of the bearing using at least one sensor, obtaining identification data uniquely identifying the bearing, transmitting data to and/or from the at least one sensor using an industrial wireless protocol, and recording the data concerning one or more of the factors that influence the residual life of the bearing and the identification data as recorded in a database, wherein at least one sensor is configured to be powered by electricity generated by the motion of a bearing or of the bearing during its use.

From DE 10 2007 052 426 A1, a device for transmitting data in a bearing, in particular in a rolling or sliding bearing, to a receiving device arranged on the outside of the bearing or outside the bearing, wherein the device comprises: a signal converter arranged inside the bearing capturing signals and converting them into sound, and a bearing component of the bearing, in particular a bearing ring of the bearing, wherein the sound is transmitted as mechanical vibration in the body of the bearing component.

JP 2009-254163 A describes a possibility for supplying a predetermined device inside a combustion engine without an external connection to power. A power-generating device has a three-phase generator provided in a connecting rod of the internal-combustion engine, and an eccentric rotor for applying a torque to the three-phase generator. The eccentric rotor acts on the three-phase generator and results in that the generator generates force due to a movement of the connecting rod. A detector comprises a temperature measuring sensor and a transmitter and is provided at a position on the side of a small end of the connecting rod. The energy-generating device supplies energy and is provided at a position on the side of a large end. According to an embodiment variant, the energy-generating device may also be a stack of piezo elements.

From EP 1 022 702 A2, a self-powered wireless transducer for monitoring external physical conditions, such as excessive vibrations in a bearing is known. The transducer contains an energy conversion source, such as, for example, a piezoelectric sensor to sense the external physical condition and to generate a characteristic signal used for supplying an HF transmission circuit. A transmitter is provided to transmit signals indicating the external physical condition or changes to this condition, such as increased vibrations in a bearing, in order to detect bearing faults before a failure. The independent wireless transducer has a voltage storage device for receiving an electrical voltage from the piezoelectric sensor, and a voltage detector for detecting the voltage level at the voltage storage device. As soon as the voltage detector detects a voltage level at a predetermined level, an oscillating transmission circuit is activated for a short hysteresis period of the voltage detector.

EP 3 211 202 A1 discloses an engine control system for an internal combustion engine, which has at least an energy harvesting module with at least one energy converter and at least one energy module, at least one sensor for detecting a physical or chemical measurement quantity of the internal combustion engine, a microcontroller for processing the detected measurement quantities and a radio module for the wireless transmission of the measurement quantity processed by the microcontroller to a radio receiver, wherein the microcontroller is communicatingly connected to the sensor and the radio module, and wherein the energy module for transmitting electric energy is at least connected to the microcontroller and the radio module. The system further comprises an engine control device, which is communicatingly connected to the radio receiver and is designed in such a manner that it evaluates measurement quantities coming in from the radio receiver, processes these into control signals and transmits them to the internal combustion engine.

The present invention is based on the object of improving the energy supply of a consumer of electrical energy in a bearing assembly.

In the initially mentioned bearing assembly, the object is achieved in that the energy generating device has at least one electrical conductor arranged in a loop shape and at least one permanent magnet, wherein the electrical conductor is arranged on the first component and the permanent magnet is arranged on the second component, such that the electrical conductor arranged in a loop-shape and the permanent magnet can repeatedly be brought into opposing positions by means of the repetitive relative movement of the two components with respect to one another, or that the electrical conductor and the permanent magnet are arranged on the first component and a second electrical conductor and a second permanent magnet are arranged on the second component, so that the electrical conductors arranged in a loop shape and the permanent magnets can repeatedly be brought into opposing positions by means of the repetitive relative movement of the two components with respect to one another.

In the initially mentioned method, the object is further achieved in that, for generating the energy, the energy generating device is formed having at least one electrical conductor arranged in a loop shape and at least one permanent magnet, wherein the electrical conductor is arranged on the first component and the permanent magnet is arranged on the second component, and that the electrical conductor arranged in a loop-shape and the permanent magnet are brought into a repeating opposing position by means of the repetitive relative movement of the two components with respect to one another, or that the electrical conductor and the permanent magnet are arranged on the first component and a second electrical conductor and a second permanent magnet are arranged on the second component, so that the electrical conductors arranged in a loop shape and the permanent magnets are repeatedly brought into opposing positions by means of the repetitive relative movement of the two components with respect to one another.

In this regard, it is advantageous that the energy generating device can be arranged relatively far away from problematic region in the bearing assembly, such as the hot bearing region, and thus may also have a high degree of operating safety. Additionally, in terms of its geometric arrangement, the electrical conductor can be adapted more easily to the conditions in the bearing assembly without this causing a (substantial) loss of performance ability of the energy generating device. In this regard, it is further advantageous that the energy generating device can easily be retrofitted in existing bearing assembly on the one hand and can easily be upgraded by arranging further electrical conductors arranged in a loop shape on the other hand.

According to the preferred embodiment variant of the invention, it may be provided that the consumer of electrical energy has at least one sensor, which is connected to a data transmission device for transmitting data, in particular wirelessly, to a receiver of the data, as thereby, important bearing parameters can be monitored more easily.

According to a further embodiment variant of the invention, it may be provided that the first component is a connecting rod of a crank drive, and the second component is a crank cheek of the crank drive. In this regard, it is advantageous that the monitoring of operating parameters or wear values in the region of the crankshaft is possible without significant changes of the moved masses, and/or the additional mass is possible without constructive changes, easily by adapting the already existing balance weights.

For increasing the efficiency of the energy yield, another embodiment variant of the invention provides that the electrical conductor arranged in a loop shape is arranged at a first dead center of the crank drive.

For supplying at least one further consumer of electrical energy, an embodiment variant may provide that a further component of the crank drive is arranged on the front side of the crank cheek pointing away from the connecting rod in the axial direction, and that a further electrical conductor arranged in a loop shape is arranged on this further component. With this, at least two electrical conductors can be operated with only one permanent magnet, whereby the constructive effort of the energy generating device can be simplified.

For reasons stated above, this further electrical conductor arranged in a loop shape is also arranged in one of the dead centers of the crank drive according to an embodiment variant of the invention.

According to a further embodiment variant of the invention, it may be provided that the first component is a connecting rod of a crank drive, and the second component is a second connecting rod of the crank drive, whereby the effects mentioned above can also be achieved.

According to a different embodiment variant, it may also be provided that the further component is a gear or a main bearing receptacle of the crank drive. Due to the arrangement on the gear, it can also be easily monitored with respect to operating parameters. The arrangement on the main bearing receptacle, on the other hand, allows monitoring further components of the crank drive.

According to a further embodiment variant of the invention, the sensor may be embedded in the radially innermost layer of the sliding bearing element, whereby the acquisition of measurement values can be improved as disruptive effects, which may occur when the sensor is further away from the lubrication gap, can be largely prevented.

According to a further embodiment variant of the invention, it may be provided that the data transmission device is arranged on or at least partially in a connecting rod shank of the connecting rod, such that the connecting rod eyes are unaffected thereby and available for the arrangement of the sensor, and thus, the position of the sensor can be selected relatively freely.

According to a different embodiment variant of the invention, it may be provided that the first component is a planetary carrier of a planetary gearbox, and the second component is a planetary gear of the planetary gearbox. Thus, bearings in planetary gearboxes may also be monitored without significant constructive additional effort.

In this regard, it may be provided according to an embodiment variant of the invention that the sensor is arranged in a bore of a planetary gear axle of the planetary gearbox, and thereby protected accordingly.

The data transmission device in this embodiment variant of the invention may, according to a further embodiment variant, be arranged on or at least partially in the planetary carrier in order to again not limit the positioning of the sensor due to the data transmission device.

In order to improve the compactness of the arrangement for determining operating parameters of the sliding bearing element, it may be provided according to an embodiment variant of the invention that the telemetry device is arranged on or at least partially in the bearing receptacle.

For the purpose of better understanding of the invention, it will be elucidated in more detail by means of the figures below.

Figure 4:
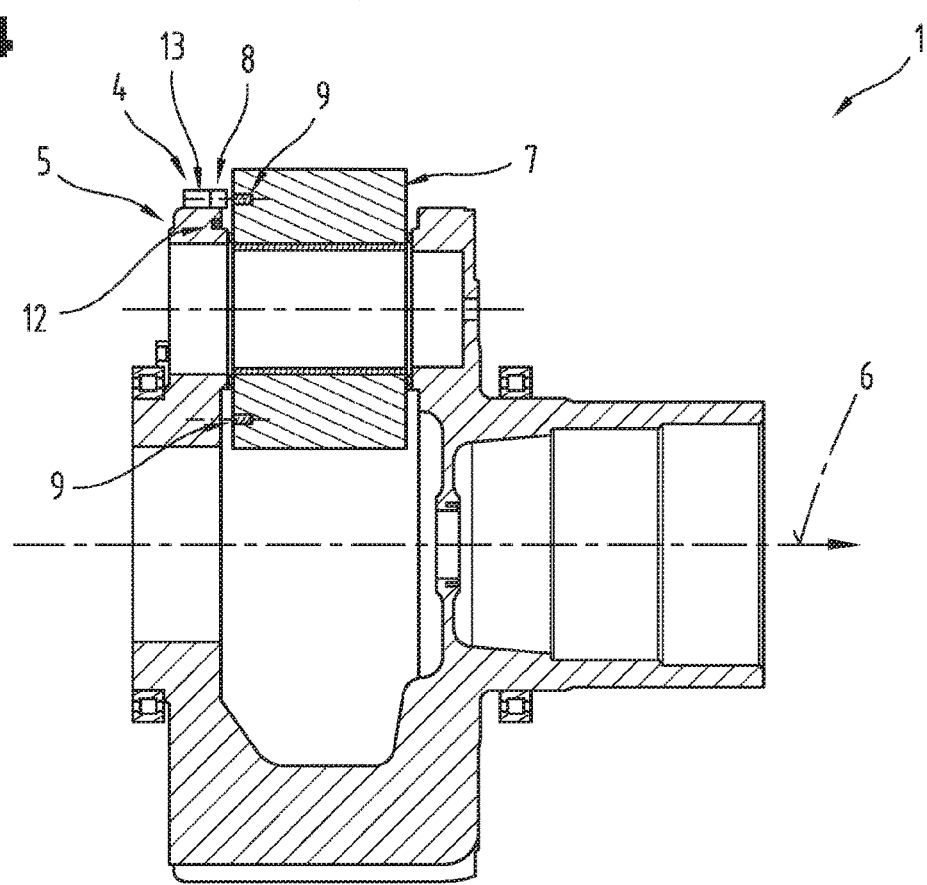
Figure 5:
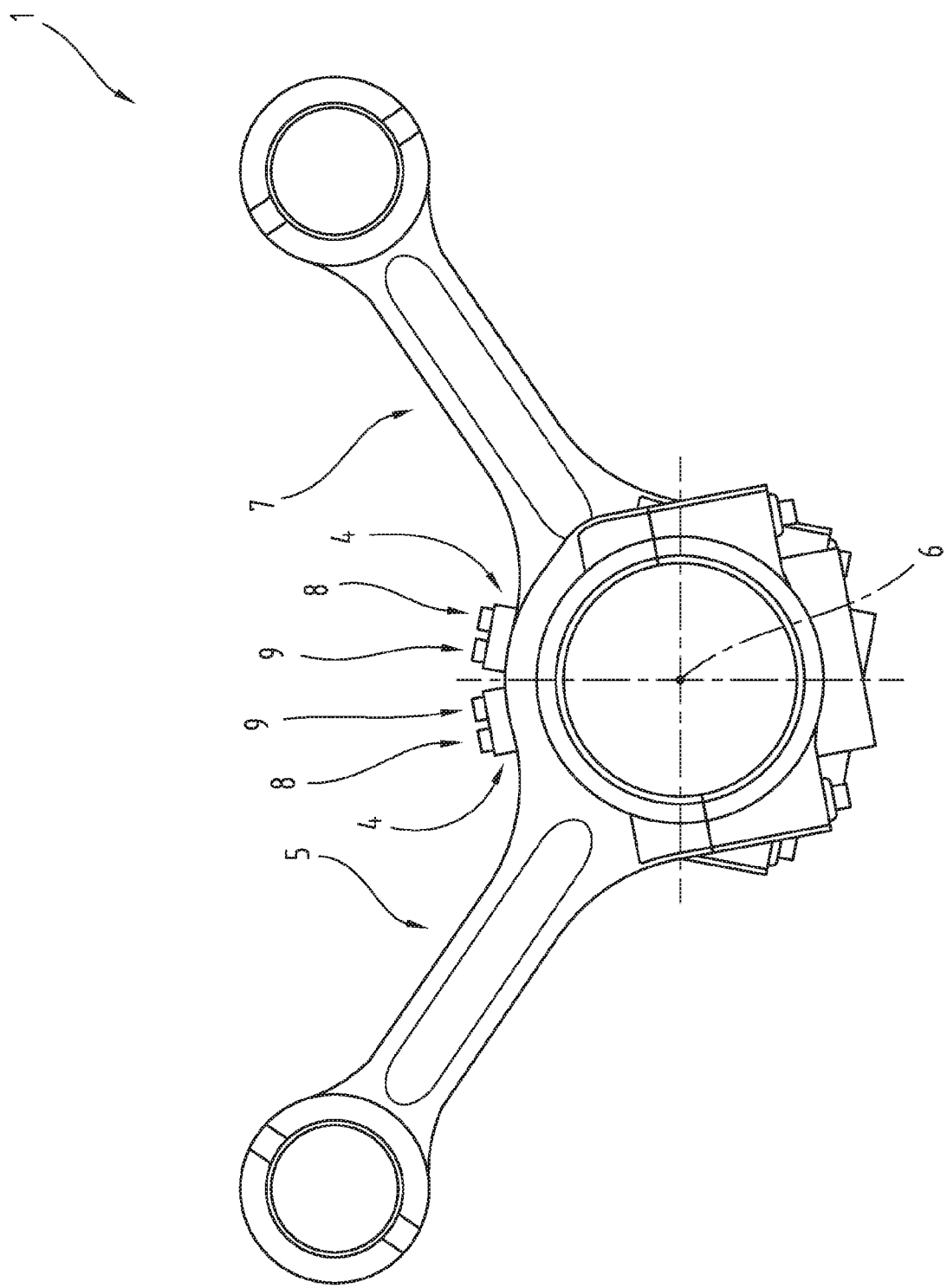

These show in a simplified schematic representation:

FIG. 1 a first embodiment variant of the bearing assembly in a first position in a lateral view;

FIG. 2 a first embodiment variant of the bearing assembly in a second position in a lateral view;

FIG. 3 a second embodiment variant of the bearing assembly in a lateral view;

FIG. 4 the second embodiment variant of the bearing assembly according to FIG. 3 in a front view;

FIG. 5 a cutout from a further embodiment variant of the bearing assembly in a front view.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIGS. 1 and 2 show a cutout from a first embodiment variant of a bearing assembly 1 in in different positions in a lateral view.

The first embodiment variant relates in particular to a crank drive, in which the bearing assembly 1 is arranged, and/or of which it is part. In this respect, the invention also relates to a gearbox, for example a push crank gearbox, of which the crank drive is a part, or a gear drive, as will be further explained below. The bearing assembly 1 is therefore particularly a part of a gearbox.

The bearing assembly 1 comprises at least one sliding bearing element 2. Two sliding bearing elements 2, which have the shape of so-called half shells, may be inserted. However, it is also possible that the sliding bearing element 2 is formed as a sliding bearing bush. Additionally, the sliding bearing equipped with the sliding bearing elements 2 may have a different divide, so that, for example, three or four or more than four sliding bearing elements 2 may be built into the sliding bearing. In very large sliding bearings, as they are used in wind energy plants, for example, the sliding bearing elements 2 may, for example, also be designed as sliding bearing pads, wherein, in these cases, considerably more than four sliding bearing elements 2, for example up to 40 sliding bearing elements 2, may be present in the sliding bearing.

The at least one sliding bearing element 2 is arranged in a bearing receptacle 3, for example by means of a press fit.

However, it is also possible that the bearing receptacle 3 is directly coated, so that the bearing receptacle 3 also forms the sliding surface for a coating supported in the sliding bearing assembly 1, for example a shaft 4. In this case, the sliding bearing element 2 and the bearing receptacle 3 are formed in one piece, so that the sliding bearing element 2 forms an integral component of the bearing receptacle 3.

In these embodiment variants of the bearing assembly 1, the counter running surface of the sliding bearing forms the surface of the shaft and/or generally of the supported component. However, it is conversely also possible to arrange the at least one sliding bearing element 2, namely to establish a torque-proof connection to the supported component. In this case, the counter running surface is formed by the surface of the bearing receptacle 3 in which the sliding bearing is received in the assembled state of the bearing assembly 1 but is not connected thereto in a torque-proof manner.

The at least one sliding bearing element 2 and the bearing receptacle 3 are part of the bearing assembly 1, which also comprises at least one consumer 4 of electrical energy, at least one energy generating device for self-sufficient provision of the electrical energy, a first component 5, and a second component 7 arranged next to the first component 5 in an axial direction 6 of the bearing assembly 1 in addition to these two constituent parts. The first component 5 is arranged so as to be movable relative to the second component 7, wherein the relative movement is repetitive.

In the embodiment variant bearing assembly shown in FIGS. 1 and 2, the first component 5 is a connecting rod of a crank drive, and the second component 7 is a crank cheek of the crank drive. Generally, however, the bearing assembly may also have a different design, so that the first and the second component 5, 7 may therefore also have a different design.

The energy generating device comprises or consists of at least one electrical conductor 8 arranged in a loop shape and at least one permanent magnet 9. The electrical conductor 8 is arranged on the first component 5, and the permanent magnet 9 is arranged on the second component 7, so that the electrical conductor 8 arranged in a loop shape and the permanent magnet 9 can repeatedly be brought into an opposing position due to the repetitive relative movements of the two components 5, 7.

Generally, the bearing assembly 1 can also have more than one energy generating device. For example, two or more or every connecting rod of a crank drive may be provided with a loop-shaped electrical conductor 8, in particular if each connecting rod is provided with a consumer 4.

The electrical conductor 8 arranged in a loop shape may be a coil, for example a cylindrical coil or a toroidal coil, in which multiple windings are formed on a core, as it is known for coils of this kind. Preferably, however, the electrical conductor is designed as a printed conductor loop, which particularly has multiple loops. The electrical energy is thus generated by electromagnetic induction due to the permanent magnet 9 moving past the electrical conductor 8.

The electrical conductor 8 particularly consists of copper although it may also consist of a different metal or a metal alloy, for example of silver.

The loop-shaped electrical conductor 8 may be arranged on the first component 5, thus in particular the connecting rod, or at least partially in a recess of the first component, for example in an indentation of the connecting rod.

The permanent magnet 9 may be designed, for example, as an NdFeB magnet. However, other materials with permanent-magnetic properties may also be used.

The at least one permanent magnet 9 may be arranged on the second component 7, that is in particular the crank cheek (may also be referred to as a counterweight and/or oscillating weight), or at least partially in a recess of the second component 7, for example an indentation in the crank cheek.

According to a different embodiment variant of the invention, it is possible that the at least one permanent magnet 9 is arranged in a through hole passing through the second component 7 in the axial direction 6, as can be seen in FIGS. 1 and 2. Thus, it is possible that a further component 11 of the bearing assembly 1, in particular of the crank drive, is arranged on an end face 10 of the second component 7, in particular the crank cheek, facing away from the first component 5, in particular the connecting rod, in the axial direction 6, and that a further electrical conductor 8 arranged in a loop shape is arranged on said further component 11. This way, it is possible to repetitively coat multiple positions with electrical conductors 8 arranged in a loop shape with only one arrangement of one or more permanent magnets 9 on the second component 7, so that two energy generating devices can be provided with fewer components.

The further component 11 may, for example, be a gear, for example a gear for a balance shaft of the crank drive. However, it may also be a cap of a housing in which the crank drive is arranged, so that the generated electrical energy may also be transmitted to a different/more removed location via electrical lines on or in the housing, meaning that the consumer 4 is not to be arranged in the vicinity of the electrical conductor 8 arranged in a loop shape, as it is preferably the case for the power supply of the consumer 4 on the connecting rod. Furthermore, the further component 11 may be a main bearing receptacle of the crank drive.

The electrical conductor(s) 8 arranged in a loop shape may generally be arranged at any suitable location on the first and/or further component 5, 11. According to a preferred embodiment variant of the bearing assembly 1 formed as a crank drive, the electrical conductor(s) 8 arranged in a loop shape are, however, arranged at a first dead center of the crank drive, that is in the top and/or in the bottom dead center as it is shown in FIGS. 1 and 2, wherein FIG. 1 shows the top dead center and FIG. 2 shows the bottom dead center.

The term "dead center" is sufficiently known in the context of crank drives. In this regard, it is to be noted that the top dead center is that position in which the piston arranged on the connecting rod has greatest distance from the crankshaft. The bottom dead center is therefore that position in which the piston has the closest distance from the crankshaft. In other word, the dead centers are those positions in which the piston does not experience any axial movement. If, within the meaning of the invention, it is specified that the electrical conductor 8 arranged in a loop shape is arranged at a dead center of the crank drive, this means that the electrical conductor 8 arranged in a loop shape is arranged such that it is opposite the permanent magnet 9 in the top or the bottom dead center position.

With respect to the specification "on the component", it is noted that this includes "on" and also "at least partially in" the component, for example in an indentation of the component.

The electrical conductor 8 arranged in a loop shape is preferably stationarily arranged on the crankshaft housing cover or crank housing. The further electrical conductor 8 arranged in a loop shape is preferably arranged stationarily on the connecting rod on the connecting rod shaft or cover of the connecting rod.

According to a further embodiment variant of the bearing assembly 1, the consumer 4 of electrical energy may comprise at least one sensor 12. Of course, it is also possible for more than one sensor 12 to be arranged in the bearing assembly 1.

The sensor 12 may, for example, be a temperature sensor, a pressure sensor, etc. With the aid of the at least one sensor 12, parameters of the bearing assembly 1 can be acquired during operation. Based on these parameters, for example conclusions about the state of the at least one sliding bearing element 2 may be made, as, for example, an anomalous increase in temperature may point to the wear of the sliding surface of the sliding bearing element 2 and/or the failure of the sliding bearing element 2. Thus, parameters essential for the operation of the bearing assembly 1 can be acquired using the sensor 12.

Preferably, the acquired parameters, i.e. the associated data, are not processed in the bearing assembly 1 itself but rather in a data processing element arranged at a distance from the at least one sliding bearing element 2. For transmitting the data to this at least one data processing element, the bearing assembly 1 may have, according to a further embodiment variant, a telemetry device 13 with a data transmission device as the electrical consumer 4, which data transmission device receives the data from the at least one sensor 12 and transmits it, in particular wirelessly, to the at least one data processing element as the data receiver. For the wireless transmission of data, the known protocols can be used. The wireless transmission of data may take place, for example by means of Bluetooth or WLAN.

As such systems for acquiring data in sliding bearing elements and wirelessly transmitting it to an external station is already known per se from the prior art relevant for sliding bearings, reference is made to said prior art in order to avoid repetitions regarding further details.

The telemetry device 13 may be arranged on or at least partially in the first component 5, for example a connecting rod shaft of the connecting rod of the crank shaft.

The at least one sensor 12 may be, for example a piezo active and/or piezo electrical element. Furthermore, the at least one sensor 12 can be designed to be subjected to pressures of up to 10,000 bar.

The sensor 12 may be connected to a lubrication gap 14 of the sliding bearing by means of a line. As an alternative or in addition thereto, it may be provided according to a further embodiment variant of the bearing assembly 1 that the sensor 12 is arranged in the lubrication gap 14, for example as a part of the sliding layer of the sliding bearing element 2. With this, as well, the sensor 12 can be impinged upon by a lubrication pressure in the lubrication gap 14 like in the previously mentioned embodiment variant of the bearing assembly 1.

According to a different embodiment variant of the bearing assembly 1, it may be provided that the sensor 12 is embedded in a radially innermost layer of the sliding bearing element 2. The sliding bearing element 2 may be designed as a so-called multi-layer sliding bearing and have at least one sliding layer and one support layer. Between these, further layers, such as a bearing metal layer and/or a bonding layer and/or a diffusion barrier layer, etc. may be arranged. In this regard, the sliding layer is, as is known, that layer on which the shaft 4 slides during operation. The sliding layer may consist of a ceramic material or of an anti-friction varnish, for example. Alternatively, however, it may be provided that the sensor 12 is arranged in a layer arranged underneath the sliding layer and is separated from the sliding layer via an electrically insulating layer, for example a ceramic layer made of e.g. Al$_2$O$_3$. In this case, the sliding layer may consist of a known, metallic material, for example a tin based alloy.

It should be noted that, in the case of a direct coating as mentioned above, the support layer is formed by the respective directly coated component.

It is also possible to arrange multiple sensors 12 at different locations in the sliding bearing element 2 or on the sliding bearing element 2, so that the operating parameters of differently stressed locations in the bearing assembly 1 can be acquired.

Using the sensor 12 or the sensors 12, operating parameters of the large connecting rod eye and/or the small connecting rod eye of the connecting rod of a crank drive can be acquired.

The previously mentioned telemetry device 13 may comprise, e.g. the data transmission device, a microprocessor 30, an analog to digital converter 31, etc. as its constituent parts. The electrical conductor 8 arranged in a loop shape may possibly also be a constituent part of the telemetry device 13.

FIGS. 3 and 4 show a further and possibly independent embodiment variant of the bearing assembly 1 in the longitudinal section, wherein again, equal reference numbers and/or component designations are used for equal parts as in FIGS. 1 and 2 above. In order to avoid unnecessary repetitions, it is pointed to/reference is made to the detailed description regarding the components in the description of FIGS. 1 and 2 above.

In the embodiment variant of the bearing assembly 1 shown in FIGS. 3 and 4, the first component 5 is a planetary carrier of a planetary gearbox, and the second component 7 is a planetary gear of the planetary gearbox. Like the electrical conductor 8 arranged in a loop shape, the consumer 4 of electrical energy is arranged on the first component 5. The electrical consumer 4 may, for example, in turn be the previously mentioned telemetry device 13 and/or a sensor 12. According to an embodiment variant, the sensor 12 may be arranged in a bore of a planetary gear axle of the planetary gearbox.

It is also possible that the electrical consumer 4 and the electrical conductor 8 arranged in a loop shape are arranged directly next to one another and/or behind one another in the axial direction 6.

The permanent magnet 9 is arranged in a recess in the second component 7 formed as a planetary gear. The rotational movement of the planetary gear results in the repetitively opposing position of the components permanent magnet 9 and electrical conductor 8 arranged in a loop shape.

As in the embodiment variant of the bearing assembly 1 discussed above, multiple electrical conductors 8 arranged in a loop shape may be arranged here, as well, in particular one per planetary gear of the planetary gearbox.

Furthermore, it is possible that multiple permanent magnets 9 are arranged for each electrical conductor 8 arranged in a loop shape, for example two (as shown in FIG. 3) or three or four.

These multiple permanent magnets 9 are preferably arranged so as to be evenly distributed in the circumferential direction of the planetary gear.

The planetary gearbox itself may have a single- or multi-stage design, for example a two-stage design.

It should be noted that in all embodiment variants of the bearing assembly 1, no direct contact in the sense of a mutual touching of the two components exists or occurs between the electrical conductor 8 arranged in a loop shape and the permanent magnet 9.

With the invention, it is possible to supply a consumer 4 of electrical energy, which is arranged in a bearing assembly 1 comprising at least one sliding bearing element 2, with electrical energy, which is generated in at least one energy generating device of the bearing assembly 1 for self-sufficient provision of the electrical energy, wherein the bearing assembly 1 further comprises a first component 5 and a second component 7 arranged next to the first component 5 in the axial direction 6 of the bearing assembly 1, said components 5, 7 being movable repetitively relative to one another. For generating the energy, the energy generating device is provided with at least one electrical conductor 8 arranged in a loop shape and at least one permanent magnet 9, wherein the electrical conductor 8 is arranged on the first component 5 and the permanent magnet 9 is arranged on the second component 7, and the electrical conductor 8 arranged in a loop shape and the permanent magnet 9 are brought into a repeating opposing position by means of the repetitive relative movement of the two components 5, 7 with respect to one another.

A cutout from a further and possibly independent embodiment variant of the bearing device 1 is shown in FIG. 5, wherein again, equal reference numbers and/or component designations are used for equal parts as in the FIGS. 1 through 4 above. In order to avoid unnecessary repetitions, it is pointed to/reference is made to the detailed description regarding the components in the description of FIGS. 1 to 4 above.

FIG. 5 shows two connecting rods of a crank drive. In this embodiment variant of the bearing assembly 1, it is provided that both the first and the second component 5, 7 are each formed by one connecting rod of the crank drive. In this regard, both the first component 5 and the second component 7 each have at least one electrical conductor 8 arranged in a loop shape and each have at least one permanent magnet 9, which in particular each supply a consumer 4 of electrical energy. The electrical conductors 8 may be arranged next to the permanent magnets 9. In this regard, next to means both laterally and (obliquely) above or (obliquely) below. In the embodiment variant of the bearing assembly 1 according to FIG. 5, they are not arranged behind one another in the axial direction 6 (extends perpendicular to the paper plane in FIG. 5). The sequence of the arrangement of electrical conductor 8 and permanent magnet 9 on the first component 5 is mirror-inverted with respect to the sequence of electrical conductor 8 and permanent magnet 9 on the second component, as can be seen in FIG. 5. Thus, the electrical conductor 8 of the first component 5 reaches a position opposite to the permanent magnet 9 of the second component 7 when the electrical conductor 8 of the second component 7 also assumes a position opposite to the permanent magnet 9 of the first component 5.

In this embodiment variant, the repetitive relative movement of the two component 5, 7 with respect to one another happens due to the rotational movement of the crankshaft, which results in a change of the position of the two connecting rods relative to each other. In this process, the angle enclosed by the two connecting rods changes (in a front view).

In the embodiment variant of the bearing assembly 1 according to FIG. 5, it is also possible that the electrical conductor 8 arranged in a loop shape of the first component 5 is arranged behind, in the axial direction 6, the permanent magnet 9 of the first component 5. In this case, at least the further component 11 exists, for example that further component 11 which is shown in FIGS. 1 and 2, so that, for example, the electrical conductor 8 arranged in a loop shape of the first component 5 cooperates with the permanent magnet 9 of the second connecting rod, and the permanent magnet 9 cooperates with the electrical conductor 8 arranged in a loop shape of the further component 11 (or vice versa).

The exemplary embodiments show and/or describe possible embodiment variants of the bearing assembly 1, while combinations of the individual embodiment variants are also possible.

Finally, as a matter of form, it should be noted that for ease of understanding of the structure of the bearing assembly 1, elements thereof are not necessarily depicted to scale.

LIST OF REFERENCE NUMBERS

1 Bearing assembly
2 Sliding bearing element
3 Bearing receptacle
4 Consumer
5 Component
6 Axial direction
7 Component
8 Conductor
9 Permanent magnet
10 End face
11 Component
12 Sensor
13 Telemetry device
14 Lubrication gap

The invention claimed is:

1. A bearing assembly (1) comprising at least one sliding bearing element (2), at least one consumer (4) of electrical energy and at least one energy generating device for self-sufficient provision of the electrical energy, wherein the bearing assembly (1) further comprises a first component (5) and a second component (7) arranged next to the first component (5) in the axial direction (6) of the bearing assembly (1), said components (5, 7) being arranged so as to be movable repetitively relative to one another, and wherein the energy generating device has at least one electrical conductor (8) arranged in a loop shape and at least one permanent magnet (9), wherein the electrical conductor (8) is arranged on the first component (5), and the permanent magnet (9) is arranged on the second component (7), such that the electrical conductor (8) arranged in a loop shape and the permanent magnet (9) can repeatedly be brought into opposing positions by repetitive relative movement of the first and second components (5, 7) with respect to one another, wherein a second permanent magnet (9) is arranged on the first component (5) and a second electrical conductor (8) is arranged on the second component (7), so that the electrical conductors (8) arranged in a loop shape and the permanent magnets (9) can repeatedly be brought into opposing positions by the repetitive relative movement of the first and second components (5, 7) with respect to one another, wherein the first component (5) is a connecting rod of a crank drive, and the second component (7) is a second connecting rod of the crank drive, or the first component (5) is a connecting rod of a crank drive, and the second component (7) is a crank cheek of the crank drive, and wherein a further component (11) of the crank drive is arranged on the front side of the crank cheek pointing away from the connecting rod in the axial direction (6), and a further electrical conductor (8) arranged in a loop shape is arranged on the further component (11), and the permanent magnet (9) is arranged in a through hole passing through the second component (7) in the axial direction (6).

2. The bearing assembly (1) according to claim 1, wherein the consumer (4) of electrical energy has at least one sensor (12), which is connected to a data transmission device for transmitting data to a receiver of the data.

3. The bearing arrangement (1) according to claim 2, wherein the sensor (12) is embedded in a radially innermost layer of the sliding bearing element (2).

4. The bearing assembly (1) according to claim 2, wherein the data transmission device is arranged on or at least partially in a connecting rod shaft of the connecting rod.

5. The bearing assembly (1) according to claim 1, wherein the electrical conductor (8) arranged in a loop shape is arranged at a first dead center of the crank drive.

6. The bearing assembly (1) according to claim 1, wherein the further electrical conductor (8) arranged in a loop shape is arranged at a second dead center of the crank drive.

7. The bearing assembly (1) according to claim 1, wherein the further component (11) is a gear or a main bearing receptacle of a crank drive.

8. The bearing assembly device (1) according to claim 1, wherein a telemetry device (13) is arranged on or at least partially in the first component (5).

9. The bearing assembly (1) according to claim 1, wherein the consumer (4) of electrical energy has at least one sensor (12), which is connected to a data transmission device for transmitting data wirelessly to a receiver of the data.

10. A method comprising:

arranging a consumer (4) of electrical energy in a bearing assembly (1) comprising at least one sliding bearing element (2), a first component (5), and a second component (7) arranged next to the first component (5) in an axial direction (6) of the bearing assembly (1), said first and second components (5, 7) being arranged so as to be movable repetitively relative to one another, forming in the bearing assembly at least one energy generating device having at least one electrical conductor (8) arranged in a loop shape and at least one permanent magnet (9), wherein the electrical conductor (8) is arranged on the first component (5), and the permanent magnet (9) is arranged on the second component (7), bringing the electrical conductor (8) arranged in the loop shape and the permanent magnet (9) into repeating opposing positions by repetitive relative movement of the first and second components (5, 7) with respect to one another, and generating the electrical energy in the at least one energy generating device to supply to the consumer, wherein a second permanent magnet (9) is arranged on the first component (5) and a second electrical conductor (8) is arranged on the second component (7), so that the electrical conductors (8) arranged in a loop shape and the permanent magnets (9) are repeatedly brought into opposing positions by the repetitive relative movement of the first and second components (5, 7) with respect to one another, or the first component (5) is a connecting rod of a crank drive, and the second component (7) is a crank cheek of the crank drive, and wherein a further component (11) of the crank drive is arranged on the front side of the crank cheek pointing away from the connecting rod in the axial direction (6), and wherein a further electrical conductor (8) arranged in a loop shape is arranged on the further component (11), and the permanent magnet (9) is arranged in a through hole passing through the second component (7) in the axial direction (6).

\* \* \* \* \*